US012723354B2

(12) United States Patent
Dyer et al.

(10) Patent No.: US 12,723,354 B2
(45) Date of Patent: Sep. 1, 2026

(54) SOFT TREATED TISSUE PRODUCT

(71) Applicant: Kimberly-Clark Worldwide, Inc., Neenah, WI (US)

(72) Inventors: Thomas J. Dyer, Neenah, WI (US); Kelly A. Balzereit, Appleton, WI (US); Angela A. Wei, Appleton, WI (US); David J. Verbael, Neenah, WI (US); Sharon L. Famuliner, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 128 days.

(21) Appl. No.: 18/796,690

(22) Filed: Aug. 7, 2024

(65) Prior Publication Data

US 2024/0392510 A1 Nov. 28, 2024

Related U.S. Application Data

(60) Continuation of application No. 18/231,275, filed on Aug. 8, 2023, now Pat. No. 12,098,510, which is a division of application No. 17/447,617, filed on Sep. 14, 2021, now Pat. No. 11,788,233.

(51) Int. Cl.

| | |
|---|---|
| ***D21H 27/00*** | (2006.01) |
| ***B32B 3/30*** | (2006.01) |
| ***B32B 5/22*** | (2006.01) |
| ***D21H 21/14*** | (2006.01) |
| ***D21H 25/00*** | (2006.01) |
| ***D21H 27/40*** | (2006.01) |

(52) U.S. Cl.
CPC ............. *D21H 27/005* (2013.01); *B32B 3/30* (2013.01); *B32B 5/22* (2013.01); *D21H 21/146* (2013.01); *D21H 25/005* (2013.01); *D21H 27/40* (2013.01); *B32B 2250/02* (2013.01); *B32B 2250/20* (2013.01); *B32B 2555/00* (2013.01)

(58) Field of Classification Search
CPC .. D21H 27/005; D21H 21/146; D21H 25/005; D21H 27/40; D21H 17/06; D21H 17/14; D21H 17/16; D21H 17/59; D21H 17/72; D21H 27/30; D21H 27/38; D21H 27/002; B32B 3/30; B32B 5/22; B32B 2250/02; B32B 2250/20; B32B 2555/00; B32B 5/02; B32B 5/26; B32B 2262/062; B32B 2307/54; B32B 2307/718
See application file for complete search history.

(56) References Cited

U.S. PATENT DOCUMENTS

| | | | | |
|---|---|---|---|---|
| 4,528,316 | A * | 7/1985 | Sorens | C09J 177/00 525/58 |
| 7,959,761 | B2 * | 6/2011 | Boettcher | D21H 21/146 162/158 |
| 9,388,534 | B2 | 7/2016 | Super et al. | |
| 9,657,443 | B2 | 5/2017 | Rekoske et al. | |
| 9,896,805 | B2 * | 2/2018 | Timm | D21H 15/04 |
| 10,081,914 | B2 * | 9/2018 | Lang | D21H 21/146 |
| 10,161,083 | B1 * | 12/2018 | Lang | D21H 27/002 |
| 10,988,900 | B2 | 4/2021 | Lee et al. | |
| 11,001,972 | B2 | 5/2021 | Margo Moreno et al. | |
| 11,028,539 | B2 | 6/2021 | Margo Moreno et al. | |
| 11,371,191 | B2 | 6/2022 | Vogt et al. | |
| 11,427,968 | B2 | 8/2022 | Vogt et al. | |
| 11,466,409 | B2 | 10/2022 | Tirimacco | |
| 11,788,233 | B2 * | 10/2023 | Dyer | D21H 27/38 162/111 |
| 2012/0228322 | A1 | 9/2012 | Comerford | |
| 2016/0250353 | A1 * | 9/2016 | Zawadzki | B31F 1/12 424/444 |
| 2016/0355986 | A1 | 12/2016 | Goulet et al. | |
| 2018/0094387 | A1 * | 4/2018 | Lang | D21H 17/33 |
| 2018/0245290 | A1 | 8/2018 | Margo Moreno et al. | |
| 2018/0274175 | A1 | 9/2018 | Gerstenhaber et al. | |
| 2018/0363246 | A1 * | 12/2018 | Lang | D21H 21/146 |
| 2021/0047781 | A1 | 2/2021 | Lang et al. | |
| 2022/0042248 | A1 | 2/2022 | Vogt et al. | |
| 2022/0090324 | A1 | 3/2022 | Vogt et al. | |
| 2022/0282428 | A1 | 9/2022 | Vogt et al. | |
| 2022/0364310 | A1 | 11/2022 | Vogt et al. | |
| 2023/0078139 | A1 * | 3/2023 | Dyer | B32B 3/30 162/111 |
| 2023/0143624 | A1 | 5/2023 | Satori et al. | |
| 2023/0374732 | A1 * | 11/2023 | Dyer | B32B 5/26 |
| 2024/0392510 | A1 * | 11/2024 | Dyer | D21H 17/16 |
| 2025/0277341 | A1 * | 9/2025 | Hanke | B31F 1/126 |

* cited by examiner

*Primary Examiner* — Jose A Fortuna
(74) *Attorney, Agent, or Firm* — KIMBERLY-CLARK WORLDWIDE, INC.

(57) ABSTRACT

The present invention provides multi-ply creped tissue products, and in particular embodiments creped wet-pressed tissue products, having substantially higher per-ply basis weights, such as from about 14.0 grams per square meter or greater. Despite having relatively high per-ply basis weights, the products are generally soft and flexible, such as having a softness value (measured as TS7) less than about 10.0 and a Stiffness Index less than about 20.0. While being soft and flexible, the tissue products are durable enough to withstand use, such as having a geometric mean tensile (GMT) greater than about 1,000 g/3".

15 Claims, 3 Drawing Sheets

SOFT TREATED TISSUE PRODUCT

BACKGROUND OF THE INVENTION

Consumers desire a soft tissue, but they also want the tissue to be thick, absorbent, and durable to protect their hands when they blow. The consumers' desires present a dilemma for the tissue maker-thickness and absorbency may be achieved by increasing the basis weight of the tissue, but at the expense of increasing stiffness which reduces softness. Increasing basis weight also impairs softness by making the tissue web more difficult to process by creping as conventional creping chemistries are limited in their ability to produce a fine crepe structure at higher basis weights.

Some of the foregoing limitations may be overcome by treating the tissue web with a chemical softener after it has been dried and creped. These chemical additions, often referred to as post-treatment, however, add cost and complexity to the manufacturing process. Further, post-treatments are only so effective and may not contribute sufficient surface softness to overcome softness deficiencies of the base tissue web caused by increased stiffness.

One option for producing soft, high basis weight, tissue products without resorting to chemical post-treatments is described in U.S. Pat. No. 9,499,942 to Zwick et al. The '942 patent describes the use of a novel non-fibrous olefin polymer creping chemistry to improve the resulting tissue product softness. While the '942 patent enables improved tissue product softness, the non-fibrous olefin polymer creping chemistry is deposited on the tissue surface making it hydrophobic, which limits the types and amount of chemical softeners that may be added to further improve softness.

As such, a need currently exists for a tissue product that balances softness and strength and can be produced using conventional creping chemistries. There is also a need for a tissue product produced using conventional creping chemistry that balances stiffness and basis weight such that the tissue maker may produce a soft, yet thick and absorbent tissue. Further, there remains a need for a conventionally creped tissue product, the softness of which may be further enhanced by the addition of chemical softeners.

SUMMARY OF THE INVENTION

Despite the tendency of increased tensile strength to negatively affect softness, the present invention surprisingly provides a creped tissue product having both a relatively high degree of tensile strength and a relatively high degree of softness, as measured using the Tissue Softness Analyzer (TSA). Surprisingly the soft and strong tissue products of the present invention are prepared by conventional wet-pressed tissue manufacturing process and creped using conventional creping compositions such as, for example, a creping adhesive and a release agent, both of which may be a water soluble polymers.

Accordingly, in certain preferred embodiments the inventive products comprise creped wet-pressed tissue plies that have been creped using water soluble adhesive and release agents selected from the group comprising polyvinyl alcohol, starch, carboxy-methyl cellulose, poly(aminoamide)-epichlorohydrin (PAAE), polyamide epichlorohydrin (PAE), polyethyleneimine (PEI), and polymeric quaternary ammonium compounds. The plies may be manufactured by applying the adhesive agent and release agent to the dryer (on a mass basis) at a ratio from about 1.5:1 to about 0.75:1, such as from about 1.25:1 to about 0.8:1. The total amount of creping composition applied to the dryer is generally less than about 12.0 mg/m$^2$.

The use of conventional creping compositions yields tissue webs that are amendable to surface treatment with softeners such as, for example, a softening composition comprising one or more of polysiloxane, fatty-alkyl derivatives and/or glycerin. As such, in certain preferred embodiments, the present invention provides creped tissue products, particularly tissue products manufactured by a conventional wet-pressed tissue manufacturing process, comprising one or more actives disposed on the surface of the tissue product where the product has a TS7 value of about 10.0 or less.

The softness improvements are surprisingly achieved despite an increase in tensile strength. For example, in certain embodiments the tissue products may have a geometric mean tensile (GMT) of about 1,000 g/3" or greater, such as from about 1,000 to about 1,200 g/3", and a TS7 of about 10.0 or less, such as from about 8.0 to about 10.0.

In one particularly preferred embodiment the present invention provides a treated tissue product comprising three creped, wet-pressed tissue plies arranged in facing relation with one another and forming a first and a second outer surface of the tissue product and a chemical softener disposed on at least one of the product outer surfaces, the product having a geometric mean tensile strength (GMT) of about 1,000 g/3" or greater and TS7 less than about 10.0.

In still other embodiments the softness improvements are surprisingly achieved despite the tissue products having a relatively high basis weight, such as each ply of the tissue product having a basis weight of about 14.0 grams per square meter (gsm) or greater, such as from about 14.0 to about 15.5 gsm. Accordingly, in one preferred embodiment, the invention provides a tissue product comprising three creped, wet-pressed tissue plies, each ply having a basis weight of about 14.0 gsm or greater, the tissue product having a first outer surface, a second outer surface and a softening composition disposed on at least the first or second outer surface, the tissue product having a geometric mean tensile (GMT) of about 1,000 g/3" or greater and a TS7 of about 10.0 or less.

DEFINITIONS

Figure 1:
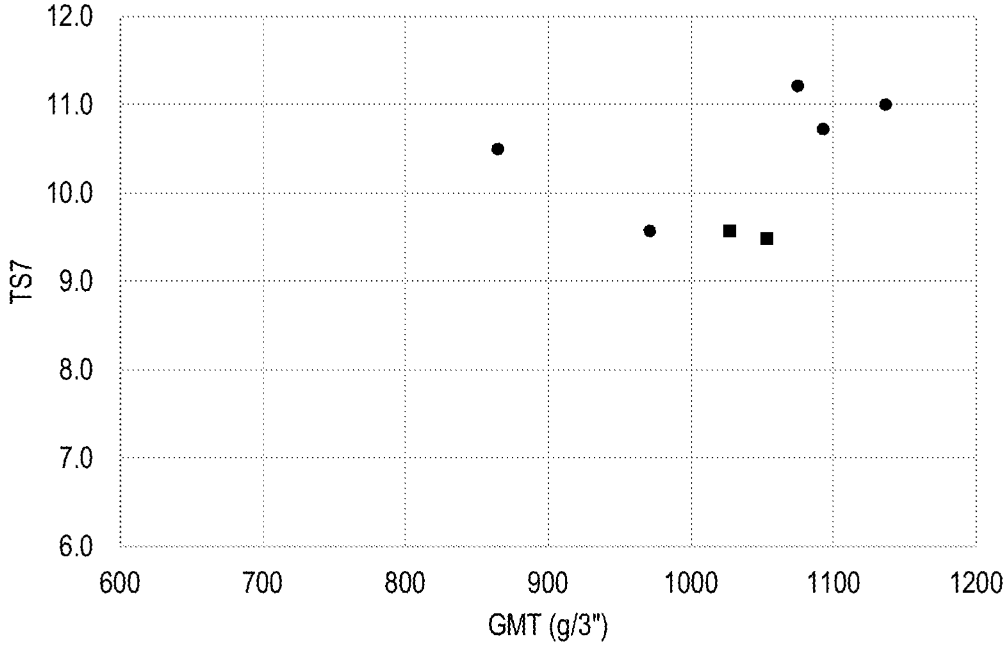
FIG. 1 is graph of GMT (g/3") of versus TS7 for inventive (■) and commercial tissue products (●)
Figure 2:
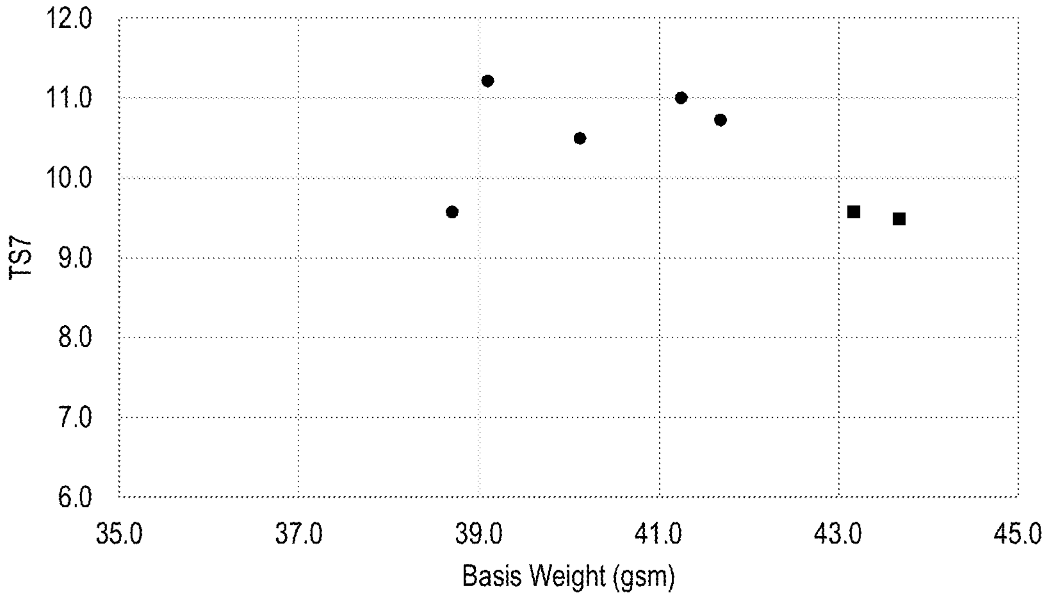
FIG. 2 is graph of Basis Weight (gsm) of versus TS7 for inventive (■) and commercial tissue products (●)
Figure 3:
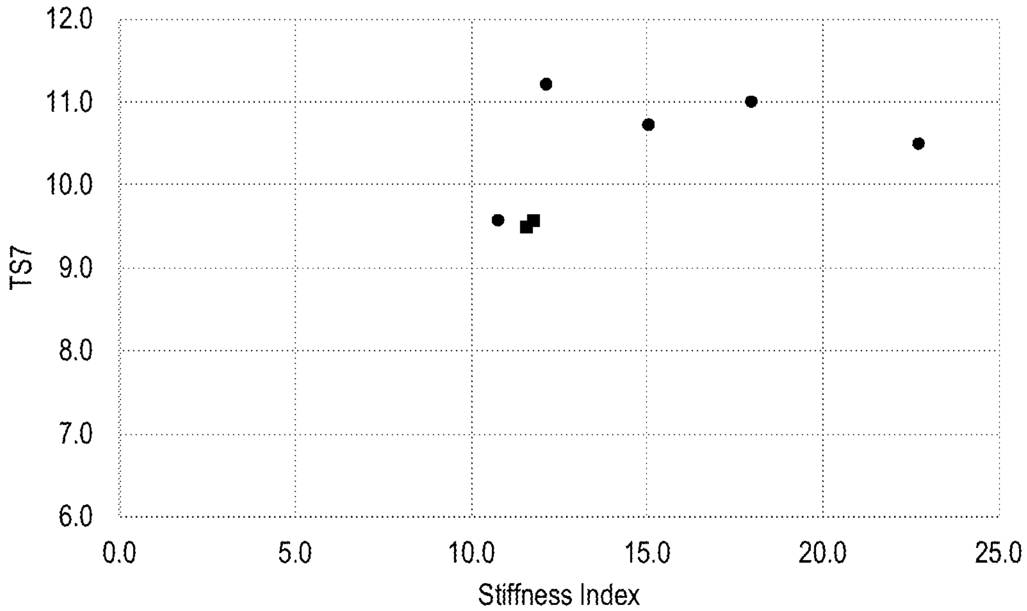
FIG. 3 is graph of Stiffness Index versus TS7 for inventive (■) and commercial tissue products (●)
Figure 4:
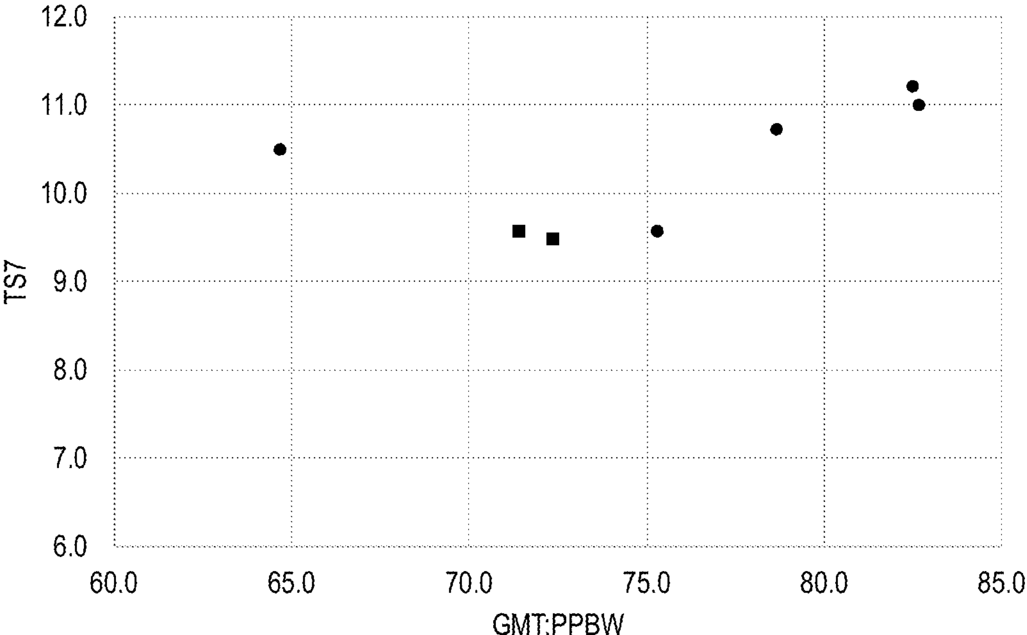
FIG. 4 is graph of TS7 of versus the ratio of GMT (having units of g/3") to Per-Ply Basis Weight (PPBW) (having units of grams per square meter) for inventive (■) and commercial tissue products (●)
Figure 5:
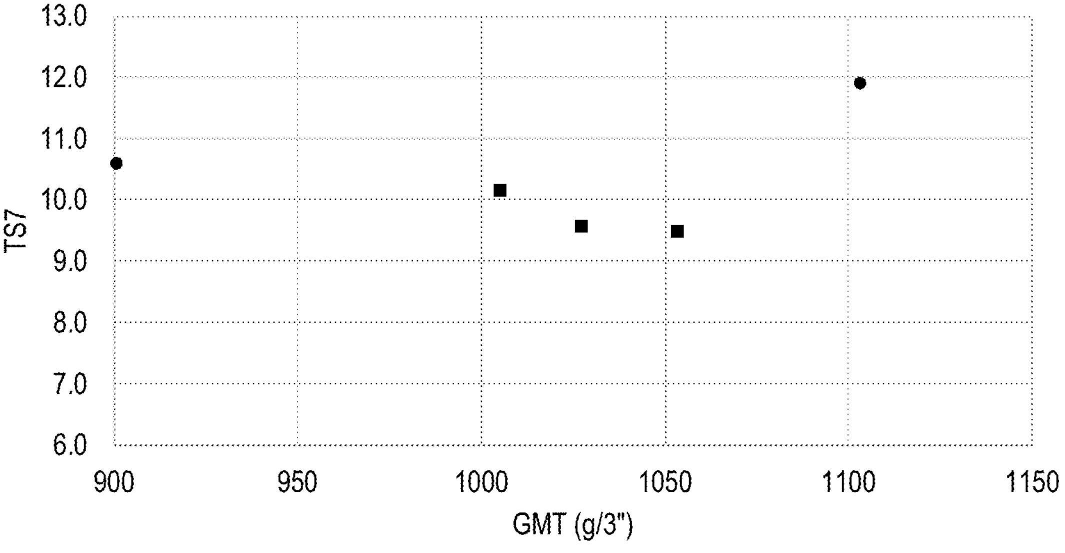
FIG. 5 is graph of GMT (g/3") of versus TS7 for inventive (■) and control (●) samples prepared according to the present example.
Figure 6:
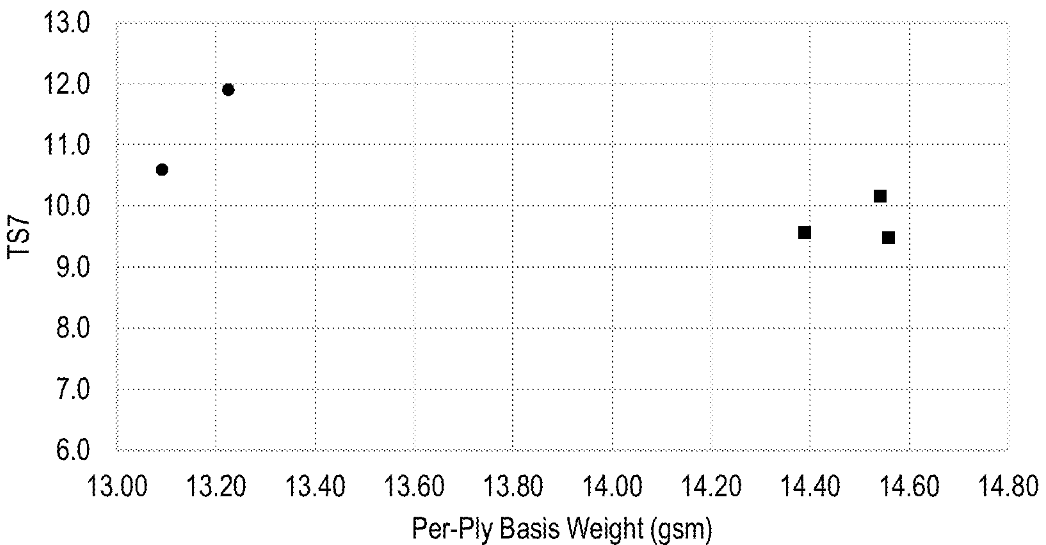
FIG. 6 is graph of TS7 of versus the ratio of GMT (having units of g/3") to Per-Ply Basis Weight (having units of grams per square meter) for inventive (■) and control (●) samples prepared according to the present example.

As used herein, the term "Conventional Creping Composition" generally refers to a composition applied to the dryer surface during the manufacture of creped tissue products, the composition comprising at least one water soluble polymer selected from f polyvinyl alcohol, starch, carboxy-methyl cellulose, poly(aminoamide)-epichlorohydrin (PAAE), polyamide epichlorohydrin (PAE), polyethyleneimine (PEI), and polymeric quaternary ammonium compounds. In certain preferred embodiments the conventional creping composition comprises an adhesive and a release agent, where the adhesive and release agents have different compositions.

As used herein the term "Wet-Pressed" generally refers to a tissue manufacturing process, and tissue products made thereby, where prior to the nascent tissue web being transferred to the dryer surface, such as a Yankee dryer, water is expressed from the web and absorbed by a water permeable belt such as a press felt, or the like. The absorption of water by the belt increases the consistency of the web. Typically, the consistency of the web is increased to about 40 percent solids or more as it is pressed. The pressed and partially dewatered web is then transferred to a dryer surface where it is dried and removed by creping.

As used herein the term "Basesheet" refers to a tissue web formed by any one of the papermaking processes described herein that has not been subjected to further processing, such as embossing, calendering, treatment with a binder or softening composition, perforating, plying, folding, or rolling into individual rolled products.

As used herein the term "Tissue Product" refers to products made from basesheets and includes, bath tissues, facial tissues, paper towels, industrial wipers, foodservice wipers, napkins, medical pads, and other similar products.

As used herein the term "Ply" refers to a discrete tissue web used to form a tissue product. Individual plies may be arranged in juxtaposition to each other.

As used herein, the term "Layer" refers to a plurality of strata of fibers, chemical treatments, or the like, within a ply. The term "Layered Tissue Web" generally refers to a tissue web formed from two or more layers of aqueous papermaking furnish. In certain instances, the aqueous papermaking furnish forming two or more of the layers comprises different fiber types.

As used herein the term "Basis Weight" generally refers to the bone dry weight per unit area of a tissue product and is generally expressed as grams per square meter (gsm). Basis weight is measured as described in the Test Methods section below. While the basis weights of tissue products prepared according to the present invention may vary, in certain embodiments the products have a basis weight greater than about 42.0 gsm, such as greater than about 42.5 gsm, such as greater than about 43.0 gsm, such as from about 42.0 to about 48.0 gsm, such as from about 42.0 to about 46.0 gsm.

As used herein the term "Per-Ply Basis Weight" generally refers to the bone dry weight per unit area of a tissue product divided by the number of tissue product plies. Basis weight is measured as described in the Test Methods section below. While the per-ply basis weights of tissue products prepared according to the present invention may vary, in certain embodiments the products have a per-ply basis weight greater than about 14.0 gsm.

As used herein, the term "Caliper" refers to the thickness of a tissue product, web, sheet, or ply, typically having units of microns (μm) and is measured as described in the Test Methods section below. Tissue products produced according to the present invention may be relatively thick and provide good substance in hand.

As used herein, the term "Sheet Bulk" refers to the quotient of the caliper (μm) divided by the bone dry basis weight (gsm). The resulting sheet bulk is expressed in cubic centimeters per gram (cc/g). Tissue products prepared according to the present invention may, in certain embodiments, have a sheet bulk greater than about 8.0 cc/g, more preferably greater than about 9.0 cc/g and still more preferably greater than about 10.0 cc/g.

As used herein, the term "Slope" refers to the slope of the line resulting from plotting tensile versus stretch and is an output of the MTS TestWorks™ in the course of determining the tensile strength as described in the Test Methods section herein. Slope typically has units of kilograms (kg) and is measured as the gradient of the least-squares line fitted to the load-corrected strain points falling between a specimen-generated force of 70 to 157 grams (0.687 to 1.540 N).

As used herein, the term "Geometric Mean Slope" (GM Slope) generally refers to the square root of the product of machine direction slope and cross-machine direction slope. While the GM Slope may vary amongst tissue products prepared according to the present invention, in certain embodiments, tissue products may have a GM Slope of about 16.0 kg or less, such as about 15.0 kg or less, such as about 13.0 kg or less, such as from about 10.0 to about 13.0 kg, such as from about 10.5 to about 12.5 kg.

As used herein, the term "Geometric Mean Tensile" (GMT) refers to the square root of the product of the machine direction tensile strength and the cross-machine direction tensile strength of the web. The GMT of tissue products prepared according to the present invention may vary, however, in certain instances the GMT may be at least about 1,000 g/3" or greater, such as about 1,050 g/3" or greater, such as about 1,100 g/3" or greater, such as about 1,150 g/3" or greater, such as about 1,200 g/3" or greater, such as from about 1,000 to about 1250 g/3", such as form about 1,050 to about 1,200 g/3".

As used herein, the term "Stiffness Index" refers to the quotient of the geometric mean tensile slope, defined as the square root of the product of the MD and CD slopes (having units of kg), divided by the geometric mean tensile strength (having units of grams per three inches).

$$\text{Stiffness Index} = \frac{\sqrt{MD \text{ Tensile Slope (kg)} \times CD \text{ Tensile Slope (kg)}}}{GMT \; (\text{g/3}'')} \times 1{,}000$$

While the Stiffness Index of tissue products prepared according to the present invention may vary, in certain instances the Stiffness Index may be about 20.0 or less, such as about 18.0 or less, such as about 16.0 or less, such as from about 8.0 to about 20.0, more preferably from about 10.0 to about 16.0 and still more preferably from about 10.0 to about 12.0.

As used herein, the term "Wet/Dry Ratio" refers to the ratio of the wet cross-machine direction (CD) tensile strength to the dry CD tensile strength. Wet and dry CD tensile are measured as set forth in the Test Methods section below. The Wet/Dry Ratio of inventive tissue products may vary depending on several factors such as, for example, the creping composition and the amount of wet strength additive, however, in certain instances the inventive tissue products may have a Wet/Dry Ratio of about 0.20 or greater, such about 0.25 or greater, such as from about 0.20 to about 0.30, such as from about 0.22 to about 0.28.

As used herein, the term "TS7" generally refers to the softness of a tissue product surface measured using an EMTEC Tissue Softness Analyzer ("Emtec TSA") (Emtec Electronic GmbH, Leipzig, Germany) interfaced with a computer running Emtec TSA software (version 3.19 or equivalent). The units of the TS7 are dB V2 rms, however, TS7 values are often referred to herein without reference to units. Generally, the TS7 is the magnitude of the peak occurring at a frequency between 6 and 7 kHz which is produced by vibration of the tissue product during the test procedure. Generally, a peak in this frequency range having a lower amplitude, and hence a lower TS7 value, is indicative of a softer tissue product.

DETAILED DESCRIPTION OF THE INVENTION

In general, the present invention is directed to a tissue product, particularly a tissue product produced using a creped, wet-pressed process, having both a relatively high degree of strength and softness. Despite the relatively high strength, such as geometric mean tensile (GMT) strength greater than about 1,000 g/3", the tissue products have improved softness (measured as TS7, where a lower value indicates a softer product) and stiffness compared to similarly manufactured tissue products. The discovery that of creped, wet-pressed tissue product having both high strength and softness is surprising as the two properties are typically inversely related. Here, however, the inventors have overcome several limitations of the creped, wet-pressed tissue manufacturing process, by optimizing the creping chemistry and add-on, to produce a tissue product that is both soft and strong.

Accordingly, in certain instances the negative effects often associated with increasing tensile strength have been overcome by altering the creping conditions, which in-turn, have altered the surface properties of the resulting tissue web increasing its softness. Further, because the products are creped using conventional creping chemistries, they may be post-treated with hydrophobic softeners that further increase softness. Thus, in certain embodiments, the present invention provides a creped, wet-pressed tissue product having a softening composition disposed thereon, the product having a GMT greater than about 1,000 g/3" and TS7 of about 10.0 or less.

Generally, the GMT of the inventive tissue products is least about 1,000 g/3", such as about 1,050 g/3" or greater, such as about 1,100 g/3" or greater, such as about 1,150 g/3" or greater, such as about 1,200 g/3" or greater, such as from about 1,000 to about 1,250 g/3", such as form about 1,050 to about 1,200 g/3". At the foregoing tensile strengths, the inventive tissue products generally have a TS7 of about 10.00 or less, such as about 9.75 or less, such as about 9.50 or less, such as from about 8.00 to about 10.00.

In certain instances, the inventive tissue products may also be produced at relatively high basis weights, such as per-ply basis weights of about 14.0 grams per square meter (gsm) or greater, such as about 14.25 gsm or greater, such as about 14.50 gsm or greater, such as from about 14.0 to about 16.0 gsm per-ply, such as from about 14.0 to about 15.0 gsm per-ply. In certain embodiments the tissue products may comprise three plies and have a basis weight of about 42.0 gsm or greater, such as about 42.5 gsm or greater, such as about 43.0 gsm or greater, such as from about 42.0 to about 46.0 gsm, such as from about 42.0 to about 45.0 gsm, such as from about 42.0 to about 44.0 gsm.

Further, in certain instances increases in basis weight, particularly per-ply basis weight, may be accompanied by a commensurate increase in tensile strength without negatively affecting stiffness or softness. Thus, in certain embodiments, it may be desirable to maintain the ratio of tensile strength (measured as geometric mean tensile strength and having units of grams per three inches), to per-ply basis weight (bone dry basis weight having units of grams per square meter) in the range from about 70 to about 75, such as from about 70 to about 74, such as from about 70 to 73. For example, in a particularly preferred embodiment, tissue products of the present invention consist of three plies, where each of the plies is a creped, wet-pressed tissue ply, the product having a GMT from about 1,000 to about 1,200 g/3" and a ratio of tensile strength, measured as GMT, to per-ply basis weight in the range from 70 to 75.

Despite having increased basis weights, particularly for multi-ply creped, wet-pressed products, the inventive tissue products generally have relatively low degrees of stiffness. For example, the inventive tissue products may comprise three plies where each ply has a basis weight of about 14.0 gsm or greater and a Stiffness Index of about 20.0 or less, such as about 18.0 or less, such as about 16.0 or less, such as from about 8.0 to about 20.0, more preferably from about 10.0 to about 16.0, and still more preferably from about 10.0 to about 12.0. The low degree of stiffness demonstrated by the inventive tissue products is surprising because increases in basis weight often increase the thickness of the tissue sheet and negatively affect creping performance, both of which stiffen the sheet and reduce softness.

In other instances the inventive tissue products may have a GMT of at least about 1,000 g/3", such as about 1,050 g/3" or greater, such as about 1,100 g/3" or greater, such as about 1,150 g/3" or greater, such as about 1,200 g/3" or greater, such as from about 1,000 to about 1250 g/3", such as from about 1,050 to about 1,200 g/3" and a geometric mean slope (GM Slope) of about 12.0 kg or less, such as about 11.5 kg or less, such as about 11.0 kg or less, such as from about 10.0 to about 12.0 kg, such as from about 10.5 to about 11.5 kg.

In certain preferred embodiments the inventive tissue products may comprise three tissue plies, where each ply is a creped, wet-pressed tissue ply having a basis weight of at least about 14.0 gsm, the products having a GMT of at least about 1,000 g/3" and a Stiffness Index of about 12.0 or less.

The decrease in stiffness may also be accompanied by a commensurate improvement in softness, such as the products having a Stiffness Index of about 20.0 or less, such as about 18.0 or less, such as about 16.0 or less, such as from about 8.0 to about 20.0, more preferably from about 10.0 to about 16.0 and still more preferably from about 10.0 to about 12.0, and a TS7 value (a measure of softness where a lower value indicates a softer tissue) of about 10.00 or less, such as about 9.75 or less, such as about 9.50 or less, such as from about 8.00 to about 10.00.

Compared to commercially available tissue products, the inventive products are generally softer and less stiff despite having higher GMT and increased per-ply basis weight, as shown in Table 1 below.

TABLE 1

| Sample | Basis Weight (gsm) | GMT (g/3") | GM Slope (kg) | Stiffness Index | TS7 | Per-ply Basis Weight (gsm) | GMT: Per-ply Basis Weight |
|---|---|---|---|---|---|---|---|
| Great Value Ultra Soft | 41.2 | 1137 | 20.41 | 18.0 | 11.0 | 13.7 | 82.7 |
| Kleenex Ultra Soft Facial Tissue | 38.7 | 971 | 10.45 | 10.8 | 9.6 | 12.9 | 75.3 |
| Kleenex Lotion Facial Tissue | 41.7 | 1093 | 16.43 | 15.0 | 10.7 | 13.9 | 78.6 |
| Up&Up Ultra Facial Tissue | 39.1 | 1075 | 13.03 | 12.1 | 11.2 | 13.0 | 82.5 |
| Scotties Ultra Facial Tissue | 40.1 | 865 | 19.65 | 22.7 | 10.5 | 13.4 | 64.7 |
| Inventive | 43.2 | 1027 | 12.09 | 11.8 | 9.6 | 14.4 | 71.4 |
| Inventive | 43.7 | 1053 | 12.19 | 11.6 | 9.5 | 14.6 | 72.4 |

Altering manufacturing conditions such as basis weight, crepe ratio, the amount of creping composition add-on and the ratio of adhesive and release agents in the creping composition may improve the physical properties of the resulting issue products, such as the product's stiffness and softness. Further, in certain instances, the tissue product's absorbency may be improved. For example, tissue products prepared according to the present invention generally have a Specific Absorbency greater than about 8.0 g/g, more preferably about 8.5 g/g or greater, such as from about 8.0 to about 10.0 g/g, despite comprising plies having a basis weight greater than about 14.0 gsm.

Not only do the inventive tissue products have a relatively high degree of absorbency at higher basis weights, but they also have surprisingly good wet tensile performance. For example, in certain embodiments, the tissue products of the present invention have a cross-machined direction wet tensile (CDWT) of about 150 g/3" or greater, such as from about 150 to about 200 g/3". In certain instances, the ratio of cross-machined direction wet tensile to cross-machine direction dry tensile (CDWT:CDT, Wet/Dry Ratio) may be at least about 0.25, such as from about 0.25 to about 0.30.

Generally the inventive tissue products of the present invention are using conventional creping compositions. Not only may the tissue products be prepared using conventional creping compositions, but the desirable physical properties may also be achieved without the use of surface modifiers, such as thermoplastic resins and more particularly the non-fibrous olefin polymers disclosed in U.S. Pat. No. 7,807,023. The use of thermoplastic resins as components of the creping composition typically increases the cost of manufacture, introduces manufacturing complexities, and may compromise one or more important physical properties such as rate of absorbency. Thus, in particularly preferred embodiments, the tissue products of the present invention are manufactured by partially dewatering the tissue web with a press felt and then pressing the partially dewatered web onto a dryer surface. Preferably the dryer surface is treated with a conventional creping composition comprising an adhesive and a release agent.

In other embodiments, the inventive tissue products are produced using conventional creping compositions and then post-treated with a softening composition. Generally, the foregoing treatments are applied to at least one outer surface of the tissue web after the web has been finally dried and creped, i.e., post-treated. Post treatment may be performed using any one of a number of well-known methods including, for example, by printing, spraying, coating, or the like.

In particularly preferred embodiments the tissue products of the present invention are post-treated with a softening composition comprising one or more of polysiloxane, fatty alkyl derivatives and glycerin (hereinafter referred to as "actives"). Hence in one aspect, the present invention provides a tissue product comprising a topically-applied softening composition, the softening composition comprising, based on the amount of actives in the composition, from about 5 to about 40 weight percent polysiloxane, from about 10 to about 50 weight percent of a fatty alkyl derivative, from about 20 to about 80 weight percent glycerin and from 0 to about 10 weight percent formulation aids and/or skin beneficial agents. In a particularly preferred embodiment, the present invention provides a tissue product consisting of three plies, wherein each ply has a basis weight from about 14.0 to about 15.0 gsm, and the plies forming the outer surfaces of the tissue product have a softening composition comprising one or more polysiloxanes, a fatty alkyl derivative and glycerin disposed thereon.

The amount of the softening composition actives in the tissue can be, based on the dry weight of the tissue, from about 0.2 to about 20 weight percent, more specifically from about 0.2 to about 10 weight percent, more specifically from about 0.5 to about 5 weight percent and still more specifically from about 1 to about 3 weight percent.

Tissue products of the present invention generally comprise cellulosic fibers and more preferably wood pulp fibers. Wood pulp fibers may be prepared using a number of different wood species and different pulping processes. For example, the wood pulp fibers may be kraft pulp fibers, sulfite pulp fibers or thermomechanical pulp fibers. Further, the wood fibers may have any high-average fiber length wood pulp, low-average fiber length wood pulp, or mixtures of the same. One example of suitable high-average length wood pulp fibers include softwood fibers such as, but not limited to, northern softwood, southern softwood, redwood, red cedar, hemlock, pine (e.g., southern pines), spruce (e.g., black spruce), combinations thereof, and the like. One example of suitable low-average length wood fibers include hardwood fibers, such as, but not limited to, *eucalyptus*, maple, birch, aspen, and the like, which can also be used. In certain instances, *eucalyptus* fibers may be particularly desired to increase the softness of the web. *Eucalyptus* fibers can also enhance the brightness, increase the opacity, and change the pore structure of the web to increase its wicking ability. Moreover, if desired, secondary fibers obtained from recycled materials may be used, such as secondary fibers derived from newsprint, reclaimed paperboard, or office waste.

In certain embodiments tissue products may be formed from one or more basesheets, which may comprise a single homogenous or blended layer, or be multi-layered. In those instances where the basesheet is multi-layered it may comprise, two, three, or more layers. For example, the basesheet may comprise three layers such as first and second outer layers and a middle layer disposed there between. The layers may comprise the same or different fiber types. For example, the first and second outer layers may comprise short, low coarseness wood pulp fibers, such as hardwood kraft pulp fibers, and the middle layer may comprise long, low coarseness wood pulp fibers, such as northern softwood kraft pulp fibers.

In those instances where the web comprises multiple layers, the relative weight percentage of each layer may vary. For example, the web may comprise first and second outer layers and a middle layer where the first outer layer comprises from about 25 to about 35 weight percent of the layered web, the middle layer comprises from about 30 to about 50 weight percent of the layered web and the second outer layer comprises from about 25 to about 35 weight percent of the layered web.

Multi-layered basesheets useful in the present invention may be formed using any number of different processes known in the art, such as the process disclosed in U.S. Pat. No. 5,129,988, the contents of which are incorporated herein in a manner consistent with the present invention. Generally, tissue webs are prepared by preparing a dilute aqueous suspension of papermaking fibers and dispersing the aqueous suspension from a headbox having an upper headbox wall and a lower headbox wall and first and second dividers. In this manner the headbox may be used to form a basesheet having outer layers and a middle layer, where each of the layers may comprise the same or different papermaking fibers.

To form the multi-layered basesheet, an endless traveling forming fabric, suitably supported, and driven by rolls, receives the layered papermaking stock issuing from the headbox. Once retained on the fabric, the layered fiber suspension passes water through the fabric. Water removal is achieved by combinations of gravity, centrifugal force and vacuum suction depending on the forming configuration.

In general, any process capable of forming a basesheet may be utilized in the present invention. For example, an endless traveling forming fabric, suitably supported, and driven by rolls, receives the layered papermaking stock issuing from the headbox. Once retained on the fabric, the layered fiber suspension passes water through the fabric. Water removal is achieved by combinations of gravity, centrifugal force and vacuum suction depending on the forming configuration. Forming multi-layered paper webs is also described and disclosed in U.S. Pat. No. 5,129,988, which is incorporated herein by reference in a manner that is consistent herewith.

In certain embodiments the aqueous fiber furnish, or more layers of a layered tissue web, such as the middle layer, may be formed without a substantial amount of inner fiber-to-fiber bond strength. In this regard, the fiber furnish used to form the web, or a given layer, can be treated with a chemical debonding agent. The debonding agent can be added to the aqueous fiber suspension during the pulping process or can be added directly to the fiber suspension prior to the headbox. Suitable debonding agents that may be used in the present invention include cationic debonding agents, particularly quaternary ammonium compounds, mixtures of quaternary ammonium compounds with polyhydroxy compounds, and modified polysiloxanes.

Suitable cationic debonding agents include, for example, fatty dialkyl quaternary amine salts, mono fatty alkyl tertiary amine salts, primary amine salts, imidazoline quaternary salts and unsaturated fatty alkyl amine salts. Other suitable debonding agents are disclosed in U.S. Pat. No. 5,529,665, the contents of which are incorporated herein in a manner consistent with the present invention. In one embodiment, the debonding agent used in the process of the present invention is an organic quaternary ammonium chloride, such as those sold under the trade name ProSoft™ (Solenis, Wilmington, DE). The debonding agent can be added to the fiber slurry in an amount of from about 1.0 kg per metric ton to about 15 kg per metric ton of fibers present within the slurry.

Particularly useful quaternary ammonium debonders include imidazoline quaternary ammonium debonders, such as oleyl-imidazoline quaternaries, dialkyl dimethyl quaternary debonders, ester quaternary debonders, diamidoamine quaternary debonders, and the like. The imidazoline-based debonding agent can be added in an amount of between 1.0 to about 10.0 kg per metric tonne.

In other embodiments, a layer or other portion of the basesheet, including the entire basesheet, may optionally include wet or dry strength agents. As used herein, "wet strength agents" are materials used to immobilize the bonds between fibers in the wet state. Any material that when added to the tissue web at an effective level results in providing the basesheet with a wet geometric tensile strength: dry geometric tensile strength ratio in excess of 0.1 will, for purposes of this invention, be termed a wet strength agent.

Particularly preferred wet strength agents are permanent wet strength agents. Particularly preferred wet strength agents are water-soluble, cationic materials, particularly those that undergo a cross-linking or other curing reactions after they have been deposited on, within, or among the papermaking fibers. Of particular utility are the various polyamide-epichlorohydrin resins. These materials are low molecular weight polymers provided with reactive functional groups such as amino, epoxy, and azetidinium groups. Polyamide-epichlorohydrin resins sold under the trade name Kymene™ (Solenis, Wilmington, DE) are particularly useful in this invention.

In other instances, the basesheet may optionally include a dry strength additive, such as carboxymethyl cellulose resins, starch based resins, and mixtures thereof. Particularly preferred dry strength additives are cationic starches, and mixtures of cationic and anionic starches. In certain instances, the dry strength agent may comprise those sold under the trade name RediBOND™ (Ingredion, Westchester, IL).

The amount of wet strength agent or dry strength added to the pulp fibers can be at least about 0.1 dry weight percent, more specifically about 0.2 dry weight percent or greater, and still more specifically from about 0.1 to about 3 dry weight percent, based on the dry weight of the fibers.

Preferably the formed web is dried by transfer to the surface of a rotatable heated dryer drum, such as a Yankee dryer. In accordance with the present invention, the creping composition may be applied topically to the tissue web while the web is traveling on the fabric or may be applied to the surface of the dryer drum for transfer onto one side of the tissue web. In this manner, the creping composition is used to adhere the tissue web to the dryer drum. In this embodiment, as the web is carried through a portion of the rotational path of the dryer surface, heat is imparted to the web causing most of the moisture contained within the web to be evaporated. The web is then removed from the dryer drum by a creping blade. Creping the web, as it is formed, further reduces internal bonding within the web and increases softness. Applying the creping composition to the web during creping, on the other hand, may increase the strength of the web.

In another embodiment the formed web is transferred to the surface of the rotatable heated dryer drum, which may be a Yankee dryer. The press roll may, in one embodiment, comprise a suction pressure roll. In order to adhere the web to the surface of the dryer drum, a creping adhesive may be applied to the surface of the dryer drum by a spraying device. The web is adhered to the surface of the dryer drum and then creped from the drum using the creping blade. If desired, the dryer drum may be associated with a hood. The hood may be used to force air against or through the web.

Additionally, tissue products of the present invention may be prepared by applying a creping composition at relatively low addition levels, such as less than about 12 mg of solids per square meter of dryer surface (mg/m$^2$), such as from about 8.0 to about 12 mg/m$^2$. In certain preferred embodiments the level of total solids add-on is about 12.0 mg/m$^2$ or less, such as about 11.0 mg/m$^2$ or less, such as about 10.0 mg/m$^2$ or less, such as from about 8.0 to about 12.0 mg/m$^2$. The present invention provides relatively modest add-on levels of creping compositions that balance adhesion and release of the web from the dryer surface without the build-up of deposits of organic and/or inorganic components that can have a negative impact on creping efficiency.

To achieve the desired creping efficiency and tissue product properties, tissue webs may be creped using a conventional creping composition comprising at least one, and more preferably at least two, water-soluble polymers. For purposes herein, "water-soluble" means that the polymers dissolve completely in water to give a solution as opposed to a latex, dispersion, or suspension of undissolved particles. Suitable water soluble polymers may be selected from the group consisting of polyamidoamine-epichlorohydrin resin, polyamine-epichlorohydrin resin, polyvinyl alcohol, polyvinylamine, polyethyleneimine, polyacrylamide, polymethacrylamide, poly(acrylic acid), poly(methacrylic acid), poly (hydroxyethyl acrylate), poly(hydroxyethyl methacrylate), poly(n-vinyl pyrrolidinone), poly(ethylene oxide), hydroxyethyl cellulose, hydroxypropyl cellulose, guar gum, starch, agar, chitosan, alginic acid, carboxymethyl cellulose, highly branched polyamidoamines and their reaction product with epichlorohydrin and silyl-linked polyamidoamines.

The water-soluble adhesive preferably comprises one or more crosslinkable polymers. Crosslinkable polymers useful in the present invention can include, for example, crosslinkable natural polymers, crosslinkable synthetic polymers, crosslinkable thermoplastic polymers or thermosetting polymers, or any combinations thereof. The crosslinkable polymers can be, for example, homopolymers, copolymers, block copolymers, multi-stage polymers, star polymers, or any combinations thereof. Non-limiting examples of polymer chemistries include, but are not limited to polyamides, polyvinyl alcohols, starches, cellulosics, poly(aminoamide)-epichlorohydrins (PAAEs) polymers, polyamide epichlorohydrin (PAE) polymers, polyethyleneimine (PEI) polymers, ionene polymers, polymeric quaternary ammonium compounds (polyquats).

In certain preferred embodiments the creping composition comprises a water soluble adhesive which may be applied together with a water soluble release agent to the drying surface through the same spray boom or other coating applicator. In a particularly preferred embodiment the water soluble adhesive comprises a poly(aminoamide)-epichlorohydrins (PAAE) polymer, a polyamide epichlorohydrin (PAE) polymers or a polyethyleneimine (PEI) polymer. Particularly preferred are PAE polymers, such those commercially sold under the trade names Kymene™, Crepetrol™ and Rezosol™ (Solenis, Wilmington, DE) and Bubond™ (Buckman Laboratories International Inc., Memphis, TN). Particularly useful adhesives include polyamidoamine epichlorohydrin polymers sold under the trade name Bubond™, such as Bubond™ 2624 or Bubond™ 2653.

Suitable creping release agents include, for example, the release agents described in U.S. Pat. Nos. 5,660,687 and 5,833,806, incorporated herein by reference in a manner consistent with the present invention. In certain instances, the release agent comprises a crosslinkable poly(aminoamide)-epichlorohydrins (PAAE) polymer or a crosslinkable polyamide epichlorohydrin (PAE) polymer such as those commercially available under the trade names Rezosol™ (Solenis, Wilmington, DE) and Busperse™ (Buckman Laboratories International Inc., Memphis, TN). Particularly useful release agents may include those commercially under the trade name Bubond® 2097 or Bubond® 2906.

In addition to the adhesive and release agents, creping compositions useful in the present invention may further comprise surfactants, dispersants, salts to adjust the water hardness, modifiers, anti-corrosion agents, fillers, opacity agents, whiteners, crosslinking agents, or other useful additives. For example, the creping composition may include an additive to minimize corrosion of the dryer surface such as those sold under the trade name Butrol™ (Buckman Laboratories International Inc., Memphis, TN).

In certain embodiments the amount of release agent may be increased relative to the amount of adhesive agent such that the ratio of adhesive agent to release agent (on a mass basis) is from about 1.5:1 to about 0.75:1, such as from about 1.25:1 to about 0.8:1. For example, in one embodiment the adhesive component may be applied to the dryer surface area at an add-on of about 5.00 mg/m$^2$ and the release agent may be applied to the dryer surface at an add-on of about 4.00 mg/m$^2$. In other embodiments the amount of release agent may exceed the amount of adhesive, such as the release agent applied to the dryer surface at an add-on of about 5.00 mg/m$^2$ and the adhesive applied to the dryer surface at an add-on of about 4.00 mg/m$^2$.

After the tissue web has been dried and creped, it may be subjected to one or more well-known converting processes such as surface treatment. In one particularly preferred embodiment, the outer surface of the dried and creped tissue web is treated with a softening composition. Hence in one aspect, the invention provides a conventional wet-pressed, creped, tissue product having a topically-applied softening composition. In certain embodiments the softening composition may comprise, one more polysiloxanes, a fatty alkyl derivative and glycerin. In other embodiments the softening composition may comprise polyethylene glycol having a molecular weight from about 1,000 to about 10,000 g/mol, one or more polysiloxanes and glycerin. Useful softening compositions are disclosed in U.S. Pat. No. 7,588,662 to Lang et al. and U.S. Pat. No. 10,988,900 to Lee et al., the contents of which are hereby incorporated by reference in a manner consistent with the present invention.

The amount of the softening composition actives in the tissue can be, based on the dry weight of the tissue, from about 0.2 to about 20 weight percent, more specifically from about 0.2 to about 10 weight percent, more specifically from about 0.5 to about 5 weight percent and still more specifically from about 1 to about 3 weight percent.

As used herein, the term "dry" weight percent in reference to a composition or tissue sheet containing a composition means that the amount of free water or other volatile components in the composition or tissue product are ignored. Stated differently, the "dry" weight percent is intended to represent the amount of "active components" in the composition. Therefore, for tissue sheets, all recited dry weight percent amounts refer to tissue sheets that have been aged for at least three (3) weeks and therefore have equilibrated with ambient conditions. The dry weight percent amounts can be determined by chemical extraction and analysis of the extract or, if the basis weight of the tissue sheet prior to treatment is known, by subtracting the basis weight of the untreated tissue from the basis weight of the treated tissue and dividing the difference by the basis weight of the treated tissue and multiplying by 100.

The softening composition can be applied to the tissue sheet in the form of a neat blend, an aqueous solution, or an aqueous emulsion. When applied as an aqueous solution or an aqueous emulsion, the concentration of the softening composition in the aqueous solution or aqueous emulsion can be from about 35 to about 80 weight percent, more specifically from about 40 to about 70 weight percent and still more specifically from about 45 to about 70 weight percent. Suitable methods of applying the softening composition to the sheet, either directly or indirectly, include printing or spraying.

The amount of polysiloxane in the softening composition, based on the total amount of actives in the composition, can be from about 1 to about 40 weight percent, more specifically from about 1 to about 30 weight percent, more specifically from about 1 to about 20 weight percent and still more specifically from about 1 to about 10 weight percent. Polysiloxanes useful for purposes of this invention can have one or more pendant functional groups such as amine, quaternium, aldehyde, epoxy, hydroxy, alkoxyl, polyether and carboxylic acid and its derivatives, such as amides and esters.

In certain instances the softening composition may optionally include glycerin. When incorporated in the softening composition, the amount of glycerin in the softening composition can be from about 5 to about 40 weight percent, more particularly from about 10 to about 30 weight percent, and still more particularly from about 15 to about 20 weight percent.

In other instances, the softening composition may comprise a fatty alkyl derivative. Examples of commercially available fatty alkyl derivatives useful in the softening compositions of the present invention include, for example, 9-EO ethoxylated tridecylalcohol, Ceteth-10, Ceteth-12 (12-EO ethoxylated cetyl alcohol) and Ceteth-20. More particularly, suitable commercially available fatty alkyl derivatives include Pluraface A-38, Macol CSA 20 and Macol LA 12 from BASF; Armeen 16D, Armeen 18D, Armeen HTD, Armeen 2C, Armeen M2HT, Armeen 380, Ethomeen 18/15 Amid 0, Witconate 90, Witconate AOK, and Witcolate C from Akzo Nobel, and Tergitol 15-S-9, Tergitol 15-S-7, Tergitol 15-S-12, Tergitol TMN-6, Tergitol TMN-10, Tergitol XH, Tergitol XDLW, and Tergitol RW-50 from Dow Chemical.

The amount of fatty alkyl derivative in the softening composition can be, based on the total amount of actives in the composition, from about 10 to about 50 weight percent, more specifically from about 20 to about 50 weight percent, and still more specifically from about 30 to about 50 weight percent.

In still other instances the softening composition may comprise a polyhydroxy compound and more preferably a relatively high molecule weight polyhydroxy compound, such as a polyhydroxy compound having a molecular weight of at least about 1,000 g/mol. A particularly preferred polyhydroxy compound has a molecular weight of greater than about 4,000 g/mol. As such the molecule weight of polyhydroxy compound may range from about 1,000 to about 12,000 g/mol and more preferably from about 1,500 to about 10,000 g/mol and still more preferably from about 6,000 to about 8,000 g/mol. Examples of polyhydroxy compounds useful in the present invention include, but are not limited to, polyethylene glycols and polypropylene glycols having a molecular weight of at least about 1,000 g/mol.

The softening composition may also comprise one or more formulation aids. Suitable formulation aids include, without limitation, emulsifiers, co-solvent, anti-foaming agents and preservatives. Suitable skin beneficial agents include, without limitation, aloe, vitamin-E, chamomile, and α-hydroxy acids.

Test Methods

Basis Weight

Prior to testing, all samples are conditioned under TAPPI conditions (23±1° C. and 50±2 percent relative humidity) for a minimum of four (4) hours. Basis weight of the sample is measured by selecting twelve (12) products (also referred to as sheets) of the sample and making two (2) stacks of six (6) sheets. In the event the sample consists of perforated sheets of bath or towel tissue, the perforations must be aligned on the same side when stacking the usable units. A precision cutter is used to cut each stack into exactly 10.16×10.16 cm (4.0×4.0 inch) squares. The two stacks of cut squares are combined to make a basis weight pad of twelve (12) squares thick. The basis weight pad is then dried in a commercial oven (e.g. Blue M Industrial Ovens serial #10089811 from Thermal Product Solutions or equivalent) and maintained at 105±2° C. for 60±5 minutes.

The dried basis weight pad is removed from the oven and then weighed on a top loading balance with a minimum resolution of 0.01 grams. The top loading balance must be protected from air drafts and other disturbances using a draft shield. Weights are recorded when the readings on the top loading balance become constant. The mass of the sample (grams) per unit area (square meters) is calculated and reported as the basis weight, having units of grams per square meter (gsm).

Caliper

Caliper is measured in accordance with TAPPI Test Method T 580 pm-12 "Thickness (caliper) of towel, tissue, napkin and facial products." The micrometer used for carrying out caliper measurements is an Emveco 200-A Tissue Caliper Tester (Emveco, Inc., Newberg, OR). The micrometer has a load of 2 kilopascals, a pressure foot area of 2,500 square millimeters, a pressure foot diameter of 56.42 millimeters, a dwell time of 3 seconds and a lowering rate of 0.8 millimeters per second.

Tensile

Tensile testing is conducted on a tensile testing machine maintaining a constant rate of elongation and the width of each specimen tested is 3 inches. Testing is conducted under TAPPI conditions. Prior to testing samples are conditioned under TAPPI conditions (23±1° C. and 50±2 percent relative humidity) for at least 4 hours and then cutting a 3±0.05 inches (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was MTS TestWorks™ for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full-scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength having units of grams per three inches (g/3"). Tensile energy absorbed (TEA) and slope are also calculated by the tensile tester. TEA is reported in units of g·cm/cm2 and slope is recorded in units of kilograms (kg). Both TEA and Slope are directionally dependent and thus MD and CD directions are measured independently.

All products were tested in their product forms without separating into individual plies. For example, a 2-ply product was tested as two plies and recorded as such. In the tensile properties of basesheets were measured, the number of plies used varied depending on the intended end use. For example, if the basesheet was intended to be used for 2-ply product, two plies of basesheet were combined and tested.

Wet CD Tensile

Wet tensile strength measurements are measured in the same manner as described for dry tensile above, but after the center portion of the previously conditioned sample strip has been saturated with distilled water and immediately prior to loading the specimen into the tensile test equipment. Sample wetting is performed by first laying a single test strip onto a piece of blotter paper (Fiber Mark, Reliance Basis 120). A pad is then used to wet the sample strip prior to testing. The pad is a green, Scotch-Brite brand (3M) general purpose commercial scrubbing pad. To prepare the pad for testing, a full-size pad is cut approximately 2.5 inches long by 4 inches wide. A piece of masking tape is wrapped around one of the 4 inch long edges. The taped side then becomes the "top" edge of the wetting pad. To wet a tensile strip, the tester holds the top edge of the pad and dips the bottom edge in approximately 0.25 inches of distilled water located in a wetting pan. After the end of the pad has been saturated with water, the pad is then taken from the wetting pan and the excess water is removed from the pad by lightly tapping the wet edge three times across a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips, so the wetted area is approximately centered between the upper and lower grips. The test strip should be centered both horizontally and vertically between the grips. (It should be noted that if any of the wetted portion comes into contact with the grip faces, the specimen must be discarded, and the jaws dried off before resuming testing.) The tensile test is then performed, and the peak load recorded as the wet CD tensile strength of this specimen. As with the dry CD tensile test, the characterization of a product is determined by the average of ten representative sample measurements.

Tissue Softness Analyzer

Softness and surface smoothness were measured using an EMTEC Tissue Softness Analyzer ("TSA") (Emtec Electronic GmbH, Leipzig, Germany). The TSA comprises a rotor with vertical blades which rotate on the tissue sample applying a defined contact pressure. The blades are pressed against the sample with a load of 100 mN and the rotational speed of the blades is two revolutions per second. Contact between the vertical blades and the tissue sample creates vibrations, which are sensed by a vibration sensor. The sensor transmits a signal to a PC for processing and display. The signal is displayed as a frequency spectrum. The frequency spectrum is analyzed by the associated TSA software to determine the amplitude of the frequency peak occurring in the range between 200 to 1000 Hz. This peak is generally referred to as the TS750 value (having units of dB V2 rms) and represents the surface smoothness of the tissue sample. A high amplitude peak correlates to a rougher surface, while a low amplitude peak correlates to a smoother surface. A further peak in the frequency range between 6 and 7 KHZ represents the softness of the sample. The peak in the frequency range between 6 and 7 KHZ is herein referred to as the TS7 value (having units of dB V2 rms). The lower the amplitude of the peak occurring between 6 and 7 KHZ, the softer the sample.

Tissue product samples were prepared by cutting a circular sample having a diameter of 112.8 mm. All samples were allowed to equilibrate at TAPPI conditions for at least 24 hours prior to completing the TSA testing. After conditioning each sample was tested as is, i.e., multi-ply products were tested without separating the sample into individual plies. The sample is secured, and the measurements are started via the PC. The PC records, processes and stores all of the data according to standard TSA protocol. The reported TS750 and TS7 values are the average of five replicates, each one with a new sample.

Examples

Samples were made using a conventional wet-pressed tissue-making process on a commercial tissue machine. The tissue products consisted of three, substantially identical tissue plies. Each individual ply consisted of three layers with machine broke and eucalyptus hardwood kraft (EHWK) making up the fabric contacting layer, Northern softwood kraft (NSWK) making up the center layer and EHWK making the dryer layer. Strength additives were added to the NSWK making up the center layer. The amount of Kymene™ 920A added to the NSWK varied as set forth in Table 2, below. FennoBond™ 3000 was also added to the NSWK as set forth in Table 2, below.

The pulp fibers from the machine chests were pumped to the headbox at a consistency of about 0.02 percent. Pulp fibers from each machine chest were sent through separate manifolds in the headbox to create a 3-layered tissue structure. The fibers were deposited onto an S-Wrap Twin Wire type of former.

The formed, wet tissue web, having a consistency of about 10 percent, was vacuum dewatered and then transferred to a Tissue Flex V3 press felt (Voith Fabric & Roll Systems Inc., Appleton, WI). The partially dewatered tissue web, supported by the press felt, was passed through the nip of a pressure roll, to increase the consistency of the web to about 40 percent. The tissue web was then adhered to the Yankee dryer, which had been treated with a creping composition by spraying the creping composition onto the dryer surface using a spray boom situated underneath the dryer.

TABLE 2

| Sample | Kymene ™ 920A (dry lb/MT) | FennoBond ™ 3000 (dry lb/MT) | Release Agent Add-on (mg/m²) | Adhesive Agent Add-on (mg/m²) |
|---|---|---|---|---|
| Control 1 | 5.60 | 1.79 | 4.0 | 5.0 |
| Control 2 | 2.97 | 4.69 | 4.0 | 5.0 |
| Inventive 1 | 3.09 | 1.07 | 4.0 | 5.0 |
| Inventive 2 | 3.92 | 0.18 | 5.0 | 4.0 |
| Inventive 3 | 4.47 | 0.25 | 5.0 | 6.3 |

The creping compositions generally comprised a mixture of Bubond™ 2653 (adhesive agent) and Busperse™ 2097 (release agent) (Buckman Laboratories International Inc., Memphis, TN). The relative add-on of the adhesive and release agents for each of the samples is detailed in Table 2. Creping compositions were prepared by dissolution of the solid polymers into water followed by stirring until the solution was homogeneous. Individual polymers were diluted depending on the desired spray coverage on the Yankee dryer. Alternatively, flow rates of the polymer solutions were varied to provide the desired amount of solids to the base web.

The sheet was dried to about 98 percent consistency as it traveled on the Yankee dryer and to the creping blade. The Yankee dryer was heated with 105 psi of steam pressure to dry the sheet to a target sheet temperature of 230° F. before the creping blade. The Yankee dryer was traveling at about 5300 FPM, unless otherwise noted. The creping blade (75 Softcrepe™ commercially available from BTG, Eclepens, Switzerland) with a 15 degree grind angle was loaded against the dryer surface and subsequently scraped the tissue sheet off of the Yankee dryer. The crepe ratio was 1.30. The creped tissue base sheet was then wound onto a core for converting.

Individual tissue webs were plied together to form a 3-ply tissue product, which was calendered with two steel rolls. The calendered 3-ply tissue product was then subjected to topical treatment with a softening composition, which was applied by offset gravure printing. The add-on levels where controlled by reducing the speed of the gravure roll relative to the speed of the offset roll. The softening composition comprised a polysiloxane (AF-2340 commercially available from Wacker Chemical), a fatty alkyl derivative (Tergitol 15-S-9 commercially available from Dow Chemical Co.) and glycerin. The resulting 3-ply treated tissue products were subject to physical testing as described above, the results of which are summarized in Tables 3 and 4, below.

TABLE 3

| Sample | Basis Weight (gsm) | Per-Ply Basis Weight (gsm) | MDT (g/3") | CDT (g/3") | GMT (g/3") | GMT: PPBW |
|---|---|---|---|---|---|---|
| Control 1 | 39.27 | 13.09 | 1274 | 637 | 901 | 69 |
| Control 2 | 39.67 | 13.22 | 1644 | 740 | 1103 | 83 |
| Inventive 1 | 43.62 | 14.54 | 1485 | 680 | 1005 | 69 |
| Inventive 2 | 43.17 | 14.39 | 1527 | 691 | 1027 | 71 |
| Inventive 3 | 43.67 | 14.56 | 1575 | 705 | 1053 | 72 |

TABLE 4

| Sample | MD Slope (kg) | CD Slope (kg) | GM Slope (kg) | Stiffness Index | Absorbency (g/g) | TS7 | Wet CDT (g/3") | CD Wet:Dry |
|---|---|---|---|---|---|---|---|---|
| Control 1 | 9.87 | 13.75 | 11.65 | 12.94 | 9.8 | 10.6 | 183 | 0.29 |
| Control 2 | 10.46 | 15.54 | 12.75 | 11.55 | 9.7 | 11.9 | 203 | 0.27 |
| Inventive 1 | 9.69 | 13.72 | 11.53 | 11.47 | 9.1 | 10.2 | 178 | 0.26 |
| Inventive 2 | 9.67 | 15.10 | 12.09 | 11.77 | 9.0 | 9.6 | 172 | 0.25 |
| Inventive 3 | 10.56 | 14.06 | 12.19 | 11.57 | 8.8 | 9.5 | 181 | 0.26 |

While the invention has been described in detail with respect to the foregoing specification and examples, the following embodiments, as well as equivalents thereof, are within the scope of the invention. Thus, in a first embodiment the present invention provides a creped tissue product comprising three plies, each ply having a basis weight of about 14.0 gsm or greater, the tissue product having a geometric mean tensile (GMT) of about 1,000 g/3" or greater and a TS7 of about 10.0 or less.

In a second embodiment the present invention provides the creped tissue product of the first embodiment having a GMT from about 1,000 to about 1,200 g/3".

In a third embodiment the present invention provides the creped tissue product of the first or second embodiments having a per-ply basis weight from about 14.0 to about 15.0 gsm per ply.

In a fourth embodiment the present invention provides the creped tissue product of any one of the first through third embodiments having a basis weight from about 42.0 to about 45.0 gsm.

In a fifth embodiment the present invention provides the creped tissue product of any one of the first through fourth embodiments having a ratio of tensile strength (measured as geometric mean tensile strength and having units of grams per three inches), to per-ply basis weight (bone dry basis weight having units of grams per square meter) in the range from about 70 to about 75.

In a sixth embodiment the present invention provides the creped tissue product of any one of the first through fifth embodiments having a GMT from about 1,000 to about 1,200 g/3" and a geometric mean slope (GM Slope) of about 12.0 kg or less.

In a seventh embodiment the present invention provides the creped tissue product of any one of the first through sixth embodiments having a TS7 value from 8.0 to 10.0.

In an eighth embodiment the present invention provides the creped tissue product of any one of the first through seventh embodiments having a GMT from about 1,050 to about 1,200 g/3", and a Stiffness Index from about 10.0 to about 12.0.

In a ninth embodiment the present invention provides the creped tissue product of any one of the first through eighth embodiments wherein the tissue product has a first outer surface, a second outer surface and a softening composition disposed on at least the first or second outer surface.

In a tenth embodiment the present invention provides a method of producing a creped tissue product comprising the steps of: dispersing cellulosic fibers to form a fiber slurry, disposing the fiber slurry on a forming fabric to form a wet tissue web, partially dewatering the wet tissue web, applying a conventional creping composition to a dryer surface, such as a Yankee dryer, pressing the partially dewatered tissue web to the dryer surface, drying the tissue web, creping the dried tissue web from the dryer surface, plying three tissue webs together, wherein each ply of the tissue product has a basis weight of about 14.0 gsm or greater, and the product has a GMT from 1,000 to about 1,200 g/3" and TS7 value from about 8.0 to about 10.0.

In an eleventh embodiment the present invention provides the method of the tenth embodiment wherein the creping composition comprises a water-soluble adhesive and a water-soluble release agent wherein the creping composition add-on ranges from about 8.0 to about 12.0 mg/m$^2$ and the ratio of adhesive agent to release agent (on a mass basis) is from about 1.5:1 to about 0.75:1.

What is claimed is:

1. A method of producing a creped tissue product comprising the steps of:

a. dispersing a plurality of first cellulosic fibers to form a first fiber slurry;
b. disposing the first fiber slurry on a forming fabric to form a wet tissue web;
c. partially dewatering the wet tissue web;
d. providing a creping composition comprising a water-soluble adhesive and a water-soluble release agent, wherein the ratio of adhesive agent to release agent (on a mass basis) is from about 1.5:1 to about 0.75:1;
e. providing a dryer having a dryer surface and a dryer surface area;
f. applying the creping composition to the dryer surface wherein the creping composition add-on ranges from about 8.0 to about 12.0 mg per square meter of dryer surface area;
g. pressing the partially dewatered tissue web to the dryer surface;
h. drying the tissue web;
i. creping the dried tissue web from the dryer surface to yield a creped, wet-pressed tissue ply;
j. topically apply a softening composition to at least one creped, wet-pressed tissue ply; and
k. plying three creped, wet-pressed tissue plies together to a form a three-ply tissue product.

2. The method of claim 1 wherein the adhesive and the release agent are different water soluble polymers selected from the group comprising polyvinyl alcohol, starch, carboxy-methyl cellulose, poly (aminoamide)-epichlorohydrin (PAAE), polyamide epichlorohydrin (PAE), polyethyleneimine (PEI), and polymeric quaternary ammonium compounds.

3. The method of claim 1 wherein the adhesive component is applied to the dryer surface at an add-on of about 5.00 mg/m$^2$ and the release agent is applied at an add-on of about 4.00 mg/m$^2$.

4. The method of claim 1 wherein the softening composition add-on, based upon the dry weight of the tissue, ranges from about 0.5 to about 5 weight percent.

5. The method of claim 1 wherein the softening composition comprises a polysiloxane, a fatty-alkyl derivative and glycerin.

6. The method of claim 1 wherein the softening composition comprises, based on the amount of actives in the composition, from about 5 to about 40 weight percent polysiloxane, from about 10 to about 50 weight percent of a fatty alkyl derivative, from about 20 to about 80 weight percent glycerin and from 0 to about 10 weight skin beneficial agent selected from the group consisting of aloe, vitamin-E, chamomile, and $\alpha$-hydroxy acids.

7. The method of claim 1 further comprising the step of adding a quaternary ammonium compound to the first fiber slurry.

8. The method of claim 1 further comprising the step of adding a permanent wet strength agent to the first fiber slurry.

9. The method of claim 1 wherein the first cellulosic fibers are softwood kraft pulp fibers and further comprising the steps of dispersing hardwood kraft pulp fibers to form a second fiber slurry and disposing the second fiber slurry on the forming fabric in a layered arrangement with the first fiber slurry to form a layered wet tissue web.

10. The method of claim 1 wherein the three-ply tissue product has a geometric mean tensile (GMT) from 1,000 to 1,200 g/3" and a TS7 value from 8.0 to 10.0.

11. The method of claim 1 wherein each ply of the three-ply tissue product has a basis weight of about 14.0 gsm or greater.

12. The method of claim 1 wherein each ply of the three-ply tissue product has a basis weight from about 14.0 to about 15.5 gsm.

13. The method of claim 1 wherein the three-ply tissue product has a basis weight from about 42.0 to about 45.0 gsm.

14. The method of claim 1 wherein the three-ply tissue product has a ratio of tensile strength (measured as geometric mean tensile strength and having units of grams per three inches), to per-ply basis weight (bone dry basis weight having units of grams per square meter) in the range from about 70 to about 75.

15. The method of claim 1 wherein the three-ply tissue product has a geometric mean slope (GM Slope) of about 12.0 kg or less.

* * * * *